(12) United States Patent
Gonzales-Caiazzo et al.

(10) Patent No.: US 7,739,706 B2
(45) Date of Patent: Jun. 15, 2010

(54) METHOD FOR CONTROLLING THE USE OF AN AUDIOVISUAL DISPLAY DEVICE, DISPLAY DEVICE FOR IMPLEMENTING THE METHOD, AND GRAPHICS INTERFACE

(75) Inventors: Nathalie Gonzales-Caiazzo, Rueil Malmaison (FR); Jacques Mingot, Noisy le Roi (FR); Robert Rodenbucher, Chambourcy (FR)

(73) Assignee: Thomson Licensing V, Boulogne-Billancourt (FR)

( * ) Notice: Subject to any disclaimer, the term of this patent is extended or adjusted under 35 U.S.C. 154(b) by 1043 days.

(21) Appl. No.: 10/472,878

(22) PCT Filed: Feb. 16, 2002

(86) PCT No.: PCT/EP02/01665

§ 371 (c)(1), (2), (4) Date: Mar. 10, 2004

(87) PCT Pub. No.: WO02/078329

PCT Pub. Date: Oct. 3, 2002

(65) Prior Publication Data
US 2004/0143839 A1 Jul. 22, 2004

(30) Foreign Application Priority Data
Mar. 22, 2001 (FR) .................. 01 03881

(51) Int. Cl.
*H04N 7/16* (2006.01)
(52) U.S. Cl. ............... 725/25; 725/28; 725/29
(58) Field of Classification Search ............ 725/25, 725/28, 29
See application file for complete search history.

(56) References Cited

U.S. PATENT DOCUMENTS 5,465,113 A * 11/1995 Gilboy .................. 725/29

(Continued)

FOREIGN PATENT DOCUMENTS

CN 1228901 9/1999

(Continued)

OTHER PUBLICATIONS

Patent Abstracts of Japan, vol. 1999, No. 07, Mar. 31, 1999 & JP 6-165054.

(Continued)

*Primary Examiner*—Christopher Kelley
*Assistant Examiner*—Franklin S Andramuno
(74) *Attorney, Agent, or Firm*—Robert D. Shedd; Joseph J. Opalach; Brian J. Cromarty

(57) ABSTRACT

The invention consists of a method for controlling the use of a device for viewing audiovisual transmissions, aiming to limit the duration of viewing audiovisual transmissions during determined time periods. The method comprises steps of inserting and displaying a first and a second duration, which define a maximum viewing time. The method also comprises a step of displaying values of binary indicators associated with determined time periods, and a step of inserting a binary indicator value for each time period, the binary value allocating the first or the second duration at this time period in order to define the viewing duration authorized during this time period. The invention also relates to the viewing device for implementing the method and a graphics interface for presenting parameters of the method.

9 Claims, 2 Drawing Sheets

U.S. PATENT DOCUMENTS

| | | | |
|---|---|---|---|
| 5,548,345 A * | 8/1996 | Brian et al. .................... | 725/27 |
| 5,969,748 A | 10/1999 | Casement et al. | |
| 5,987,611 A | 11/1999 | Freund | |
| 6,025,869 A * | 2/2000 | Stas et al. .................... | 725/28 |
| 6,223,992 B1 | 5/2001 | Yasui et al. | |
| 2004/0128681 A1 * | 7/2004 | Hancock et al. ............... | 725/30 |

FOREIGN PATENT DOCUMENTS

| | | |
|---|---|---|
| EP | 662769 | 7/1995 |
| JP | 6-165054 | 6/1994 |
| JP | 11-325537 | 11/1996 |
| JP | 11-164221 | 6/1999 |
| JP | 2000-156825 | 6/2000 |

OTHER PUBLICATIONS

Patent Abstracts of Japan, vol. 1999, No. 11, Sep. 30, 1999 & JP 11-164221.

Search Report dated Aug. 2, 2002.

* cited by examiner

METHOD FOR CONTROLLING THE USE OF AN AUDIOVISUAL DISPLAY DEVICE, DISPLAY DEVICE FOR IMPLEMENTING THE METHOD, AND GRAPHICS INTERFACE

This application claims the benefit, under 35 U.S.C. §365 of International Application PCT/EP02/01665, filed Feb. 16, 2002, which was published in accordance with PCT Article 21(2) on Oct. 3, 2002 in English and which claims the benefit of French patent application No. 0103881, filed Mar. 22, 2001.

The present invention relates to a method for controlling the use of a device for viewing audiovisual transmissions. The invention also relates to a device for viewing audiovisual transmissions implementing the method and to a graphics interface.

Nowadays, many audiovisual channels are accessible using a television receiver. Young viewers tend to spend some time in front of the screen, while their parents prefer to see them doing more useful things. It is for this reason that recent receivers are endowed with a function called "parental control" which makes it possible to limit their use.

An apparatus for controlling access to television channels is known from U.S. Pat. No. 5,465,113. The fully authorized user limits the time of use of the viewing device. Locking is carried out from a list of channels and many options are available. According to this Patent, the user authorizes access to each channel for a certain time each day, each week or each month. With a multiplicity of channels, programming becomes long and tedious. This is because the user has to select each channel and insert data corresponding to each one of them. The consequence of the large amount of data is that it is not possible to display the values of control parameters for all the channels on the same screen. According to this prior art, verification of the parental control therefore obliges the user to scan several screen pages in order to know the values of the programmed data.

European Patent Application EP 0 662 769 describes a menu for presenting viewing durations per channel displayed by an audiovisual apparatus. All the durations are programmable, and when the apparatus is able to receive a large number of channels, the display becomes dense and the management complex.

The object of the present invention is therefore to overcome the drawbacks of the prior art by proposing a particularly simple and fast method for programming the use of a device for viewing audiovisual transmissions, this method requiring few manipulations and allowing simple and fast visual control of the parameters inserted.

This aim is achieved by a method for controlling the use of a device for viewing audiovisual transmissions, comprising steps of inserting and displaying a first and a second duration, the said durations defining a maximum time for viewing audiovisual transmissions during a determined time period; the process comprises:

a step of displaying values of binary indicators associated with determined time periods, a step of inserting a binary indicator value for each time period, the binary value allocating the first or the second duration to this time period, in order to define the viewing duration authorized during this time period.

In this way, the user no longer needs to insert a duration of use for each day and for each channel. He determines and inserts, only once, two display durations, and using particularly simple commands, allocates one or other of the durations to each day of the week. By displaying the values which he has inserted, the user sees with a single glance the limitations relating to the viewing duration allocated to each day of the week.

According to a first improvement, all of the time periods together constitute a repetitive period such as a week. The programming carried out by the user is thus valid over weeks, and does not need to be programmed at the end of each week.

According to another improvement, the execution of the steps for inserting binary values and durations is subject to the proper presentation of a code. According to another improvement, the presentation of this code when the authorized duration has elapsed makes it possible to enable the display up to the end of the associated time period. According to another improvement, the second duration is fixed and is equivalent to the lack of limitation during the associated time period. In this way, the user has the choice between a limited duration or the lack of limitation.

The invention, with its characteristics and advantages, will become clearer on reading the description of a particular non-limiting exemplary embodiment made with reference to the appended drawings in which.

Figure 1:
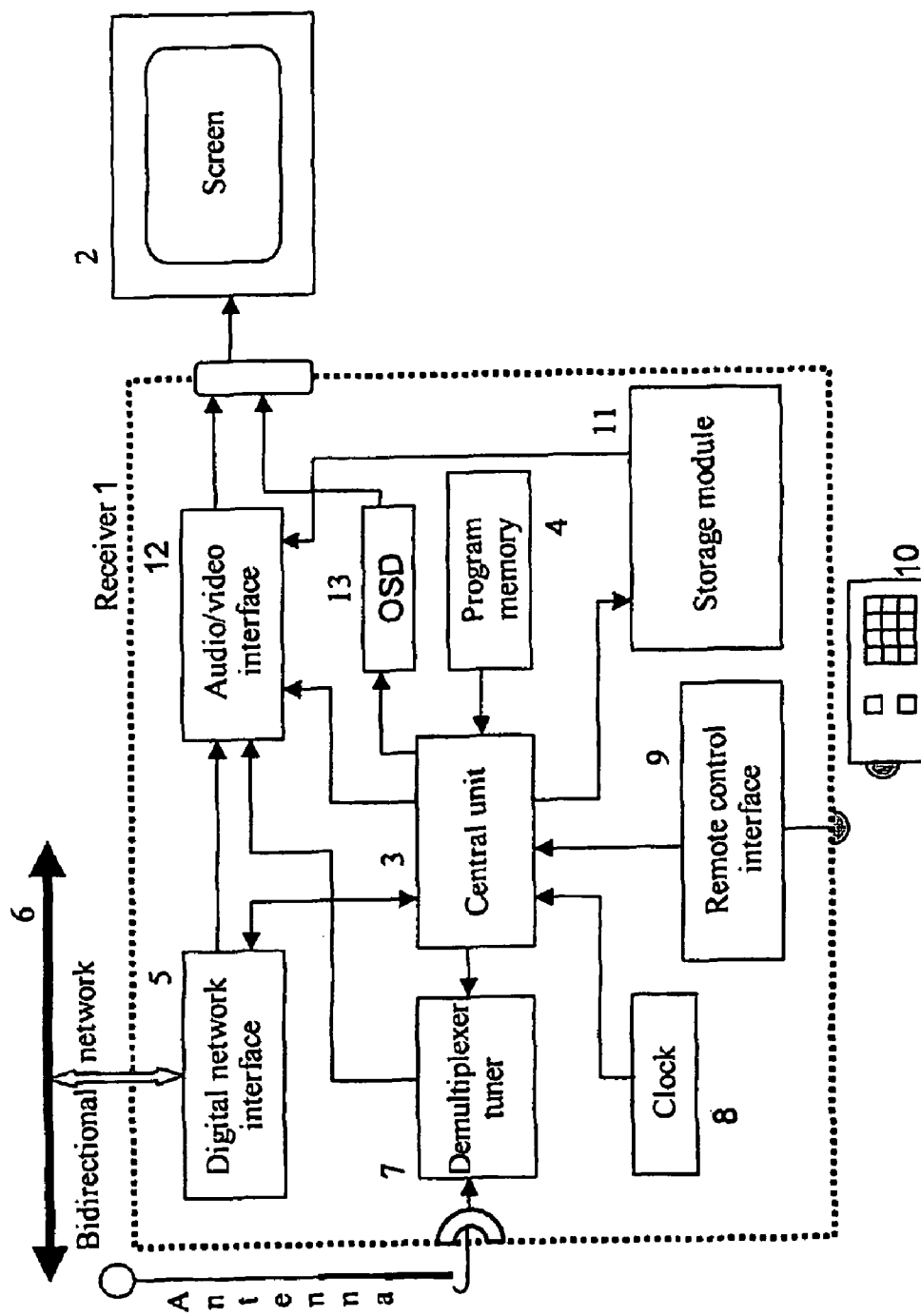
FIG. 1 is a block diagram of a viewing device for implementing the invention.

Using FIG. 1, first of all the structure of a multimedia receiver 1 furnished with a display device 2 such as a viewing screen will be described. The receiver 1 may be a television receiver or an audiovisual terminal endowed with means of communicating with a high data rate network, or an independent terminal for viewing audiovisual transmissions. The receiver 1 comprises a central unit 3 connected among others to a program memory 4, a clock 8, an infrared signal reception interface 9 for receiving signals from a remote control 10, an audio/video decoding logic 12 for the creation of audiovisual signals sent to the television screen 2, and an interface 5 for communicating with a high data rate digital network 6 making it possible to receive audio/video data. This network is, for example, an IEEE 1394 network. The receiver also comprises receiving means 7 such a tuner and a demultiplexer for receiving transmissions from a broadcasting network. The receiver further comprises a storage unit 11 for storing audiovisual transmissions. The storage medium used may be a magnetic tape, a hard disc or even an optical disc, and this may or may not be removable. The storage unit 11 is either integrated into the receiver 1, or connected to the receiver 1. The unit 11 is, in the latter case, a video recorder for example. The remote control 10 is endowed with navigation buttons ↑, ↓, → and ←, "OK" and "Menu" buttons, the role of which we will see later, and possibly a numerical pad.

The receiver also comprises a circuit 13 for displaying data on the screen, often called an OSD (On Screen Display) circuit. The OSD circuit 13 is a text and graphics generator which makes it possible to display menus, icons (for example, a number corresponding to the channel displayed) or requests on the screen for the user's intention. The OSD circuit is controlled by the central unit 3 in combination with the program recorded in the memory 4. The user selects transmissions which are either broadcast on the broadcasting network, or received through the digital network 6, using his remote control, and views them on the screen 2.

The receiver 1 may be integrated into the viewing screen, a viewing device of this sort may be a television set. A variant consists in that the receiver 1 and the screen 2 are two separate elements.

Figure 2:
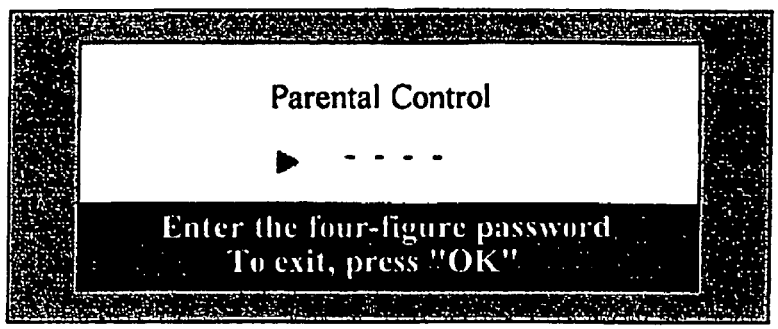
FIG. 2 shows the parental control window during insertion of the password.

By pressing on the "menu" button, the user accesses the functions for controlling the viewing device. Using the navigation buttons, he highlights the "Parental Control" function and accepts it by pressing on the "OK" button. The parental control menu is then displayed. First of all, the screen illustrated in FIG. 2 is displayed. The user inserts his password. In the exemplary embodiment, this word consists of four figures. The user inserts them using the numerical pad of the remote control and validates it by pressing on "OK".

First of all, let us assume that there is no limitation for use present on receiver 1. This is especially the case when the viewing device has just been purchased, the password then has a particular value: "0000" for example. The screen has the appearance illustrated in FIG. 3. The centre of the screen is occupied by a window called a parental control window. This window comprises a zone for presenting parameters and an information zone. The information zone located to the left has accessible functions, and the zone presenting parameters located to the right shows the value of the parameters. This latter zone has seven boxes associated with each day of the week. The days can be identified by their initials associated with the box: {M, T, W, T, F, S, S}. According to a first embodiment, the zone presents the seven days of the week, the parameters being the same from one week to another. A variant of this first embodiment consists in presenting only the next seven days starting with the present day, no restriction being programmed for the following days.

Figure 3:
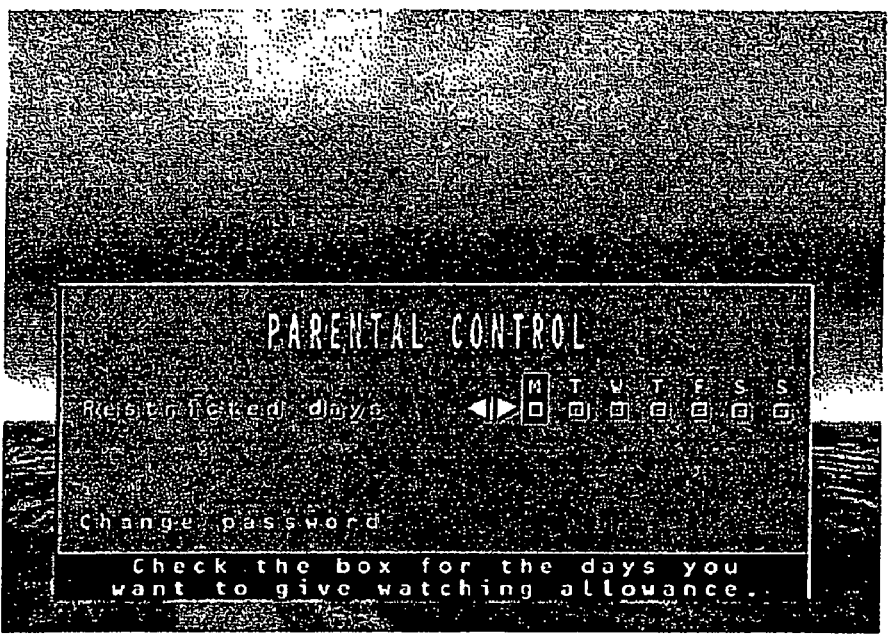
FIG. 3 shows one screen view showing that no restriction is programmed.

In the example of FIG. 3, two functions are proposed: the first is programming the days with a limitation, the second is the possibility of changing the password. The user may pass from one function to the other with the vertical navigation buttons "↑" "↓". By pressing on OK, the user validates the function and may insert the corresponding parameters.

Figure 4:
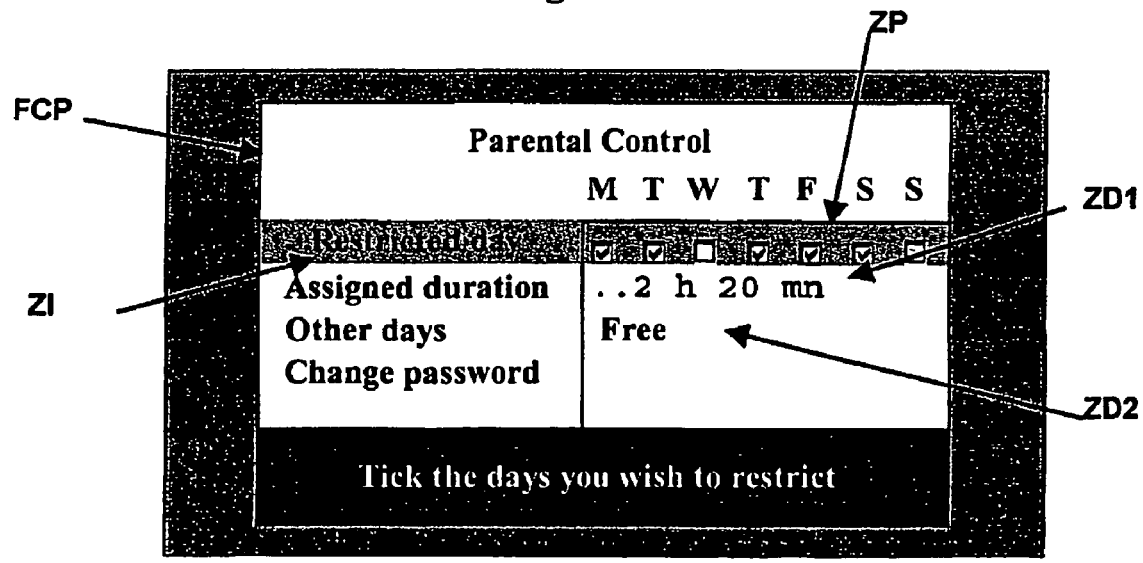
FIG. 4 shows the parental control window when viewing restrictions are programmed.

In the example described by FIG. 3, none of the seven boxes is ticked, which shows the lack of restriction on the use of the receiver. With the horizontal navigation buttons, the user highlights a box corresponding to one day, that corresponding to Monday is highlighted. By pressing on the OK button, the user programmes a restriction on the corresponding day, in this case Monday. A second press on the "OK" button removes the previously inserted limitations. The parental control window illustrated by FIG. 4 is another example of how the screen appears for the programming of parental control parameters.

In this window FCP, the information zone ZI has four functions, including the insertion of the duration assigned to the days subjected to a limitation of use, called "restricted days" and the duration assigned to the days without any limitation, called "other days". The zone presenting parameters ZI comprise three zones, the first ZPi contains a selection indication for each day of the week, the second ZD1 contains a duration corresponding to the days where the boxes are ticked and the third ZD2 contains a duration or an indication corresponding to the days which are not ticked. The duration making it possible to limit the viewing time of audiovisual transmissions is accessible by means of the "restricted days" function displayed in ZI. The durations are inserted using the "↑", "↓" buttons, the value increasing or decreasing in steps of five. A variant consists in directly typing in the value on the numeric pad of the remote control—the user firstly inserts the hours and then the minutes. The duration of use of the receiver displayed in ZD2, accessible by the "other days" function may be free (the word "free" is then displayed); in this case, viewing is unlimited during the day. The duration inserted automatically validated on exiting from the menu. It is also possible to validate it by the OK button. A particularly simple variant consists in setting the second duration to the "free" value; only the first duration, that corresponding to the restricted days, is programmable. According to this variant, the presence or absence of a ticked box immediately shows the user whether the viewing is limited or not on any day.

The user exits from the parental control menu by pressing on the "menu" button. At the next access to the parent control, the menu illustrated by FIG. 4 appears. With a single glance, the user may thus determine the days with the limitation and the assigned durations of use. When the programmed duration of use has elapsed during the day, transmissions sent to the screen are stopped. The visual consequence of this stoppage of transmission is, for example, a black screen, or a "snow" screen, or a fixed message warning of the end of the authorized viewing.

On switching off, the receiver 1 stores the time and the day in a non-volatile memory. On switching on, the receiver interrogates its clock 8 and compares the current date and time and the timetabled data stored when switching off. Thus the receiver determines whether there is a change of day and therefore if it is the first switching on of the day. If this is the case, the receiver tests whether the current day is a day with a limitation or not. If this is the case, the receiver initialises a timer in a memory with the value inserted during execution of the "restricted days" function. The value of this timer decreases during use. When the timer reaches the value 00h00, the central unit 3 transmits a signal to the audio/video interface 12 which then stops the transmission of audiovisual data towards the viewing means 2. If the current day is not a restricted day, the timer is initialised with the value inserted during execution of the "other days" function. If there is no limitation (the value inserted is "free") the user may watch without a limited duration, the timer is then inhibited and the interface 12 constantly transmits audiovisual data. If the receiver detects that this is not the first switching on of that day, it recovers the value of the timer from the memory when switching off, and this value decreases during use.

The control affects only the viewing of audiovisual transmissions and especially the audio/video decoding logic 12. The transmissions are no longer viewed when the authorized duration has elapsed. The receiving interfaces 5, 7 or 9 are not affected by the parental control, such that the receiver may continue to receive transmissions, and commands emitted by the remote control. One advantage of the present invention consists in being able to record transmissions received in the storage unit 11 even though the authorized duration of use for that day has elapsed. When the receiver integrates a magnetic cassette player/recorder, the receiver is then called a combined receiver, or "combo" for short, and this player can be used. The user may still programme the recording of audiovisual transmissions using his remote control and menus sent by the OSD, although the viewing duration for that day has elapsed. He may also programme the recording of a transmission, the duration of which is longer than that authorized. A transmission of this sort cannot be viewed in its entirety during a day with a limitation, so it is necessary to watch it over several days or on a day where the viewing duration is greater than that of the transmission.

An improvement consists in proposing to enable the viewing if the user inserts the correct password. The user having the password is typically a parent, the control not having to be imposed on him. At the end of the duration, the sending of transmissions to the display is interrupted, the parent user then makes an enabling menu appear by pressing on the "menu" button. A variant consists in automatically displaying the enabling menu when the duration has elapsed. The enabling menu is typically the same as that illustrated in FIG. 2. Via the OSD 13 the central unit 3 sends a menu to the screen, proposing that the user insert the password in order to enable the display and continue to watch the transmission. If the password is correctly inserted, the viewing of audiovisual emissions is authorized up to the next switching off and switching on cycle.

It must be obvious for persons versed in the art that the present invention allows embodiments in many other specific forms without departing from the field of application of the invention as claimed. Consequently, the present embodiments must be considered as by way of illustration, but may be modified in the domain defined by the scope of the appended claims, and the invention must not be limited to the details given above.

The invention claimed is:

1. Method for controlling access to audiovisual transmissions on an apparatus during a plurality of determined time periods wherein the method comprises:

inputting a first duration value and a second duration value for access to the audiovisual transmissions on the apparatus, said first and second duration values each defining a maximum time for viewing audiovisual transmissions during a determined time period;

displaying at the same time said first and second duration values and a plurality of values of binary indicators; and positioning binary indicator values associated with each determined time period, with one of the two values of each binary indicator specifying that the authorized access duration during the time period associated with this binary indicator is the first duration value of access, the other value of each binary indicator specifying that the authorized access duration during the determined time period associated with this binary indicator is the second duration value of access.

2. Control method according to claim 1, wherein all the time periods together constitute a repetitive period such as a week.

3. Control method according to claim 1, wherein it comprises a first step of inserting a code authorizing the execution of the steps of inserting binary values and durations.

4. Control method according to claim 3, wherein it comprises a second step of inserting a code after an elapsed display duration, the said second insertion step authorizing the display of audiovisual transmissions until the end of the current time period.

5. Control method according to claim 1, wherein the value of the second ("free") duration authorizes a maximum display time equal to that of the time period associated with the indicator.

6. Device for displaying audiovisual transmissions comprising:

means for disabling and enabling the display of audiovisual transmissions on a display means during a plurality of determined time periods, delay timer means, means of inputting a first display duration value and a second display duration value, the first and second display duration values each defining a maximum time for viewing audiovisual transmissions during a determined time period, means for displaying at the same time said first and second display duration values and a plurality of values of binary indicators, and means for inserting said binary indicator values associated with each of said plurality of determined time periods, with one of two values of each binary indicator specifying that the inserting means disables the display of the transmission when the displaying duration during the determined time period associated with this binary indicator values reaches the first display duration value.

7. Device for viewing audiovisual transmissions according to claim 6, wherein in addition, it comprises a means of inserting a code activated by a user command, the means of inserting binary indicator values being operational if the code inserted is equal to a predetermined code.

8. Device for viewing audiovisual transmissions according to claim 7, wherein the means of inserting a code can be activated at the end of the viewing duration, and if the code inserted is equal to a predetermined code, the disabling means is deactivated in order to display the audiovisual transmissions up to the end of the associated time period.

9. Device for viewing audiovisual transmissions according to claim 8, wherein the end of the viewing duration automatically triggers the means of inserting a code in order to display the audiovisual transmissions up to the end of the associated time period.

* * * * *